United States Patent
Liang et al.

(10) Patent No.: US 9,857,848 B2
(45) Date of Patent: Jan. 2, 2018

(54) CONTROL MECHANISM AND METHOD FOR A HYBRID HINGE FOR ELECTRONIC DEVICES

(71) Applicant: Intel Corporation, Santa Clara, CA (US)

(72) Inventors: Xiaoguo Liang, Shanghai (CN); Cheng Feng, Shanghai (CN); Jiancheng Tao, Shanghai (CN); Ming Zhang, Shanghai (CN); Hong W. Wong, Portland, OR (US); Zhi Wei, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/120,352

(22) PCT Filed: Mar. 27, 2014

(86) PCT No.: PCT/CN2014/074178
§ 371 (c)(1),
(2) Date: Aug. 19, 2016

(87) PCT Pub. No.: WO2015/143660
PCT Pub. Date: Oct. 1, 2015

(65) Prior Publication Data
US 2017/0068283 A1    Mar. 9, 2017

(51) Int. Cl.
*G06F 1/16*    (2006.01)
*G06F 3/01*    (2006.01)
*E05D 11/08*   (2006.01)

(52) U.S. Cl.
CPC .......... *G06F 1/1681* (2013.01); *G06F 1/1616* (2013.01); *G06F 1/1677* (2013.01);
(Continued)

(58) Field of Classification Search
CPC combination set(s) only.
See application file for complete search history.

(56) References Cited

U.S. PATENT DOCUMENTS 7,140,071 B2 * 11/2006 Tonogai .............. H04M 1/0216
                                                        16/325
8,413,302 B2 *  4/2013 Kitagawa .............. G06F 1/1616
                                                        16/320
(Continued)

FOREIGN PATENT DOCUMENTS

WO    2015/143660 A1    10/2015

OTHER PUBLICATIONS

International Search Report and Written Opinion received for PCT Application No. PCT/CN2014/074178, dated Jan. 6, 2015, 12 pages.
(Continued)

*Primary Examiner* — Lisa Lea Edmonds
(74) *Attorney, Agent, or Firm* — Hanley, Flight & Zimmerman, LLC

(57) ABSTRACT

A control mechanism and method for a hybrid hinge for electronic devices are disclosed. A particular embodiment includes: a hybrid hinge for an electronic device, the hybrid hinge comprising: a pivot; and an auxiliary component including one or more electro-magnetic or electro-mechanical devices and a variable electrical power source, the one or more electro-magnetic or electro-mechanical devices being configured to apply a variable degree of torque force to the pivot based on a degree of electrical power supplied by the electrical power source.

24 Claims, 7 Drawing Sheets

(52) U.S. Cl.
CPC ............ *G06F 3/016* (2013.01); *E05D 11/082* (2013.01); *E05Y 2201/462* (2013.01); *E05Y 2900/606* (2013.01)

(56) References Cited

U.S. PATENT DOCUMENTS

| | | | | |
|---|---|---|---|---|
| 8,860,765 | B2* | 10/2014 | Kilpatrick, II | G06F 1/1616 345/1.1 |
| 8,943,649 | B2* | 2/2015 | Chen | G06F 1/1681 16/320 |
| 8,947,320 | B2* | 2/2015 | King | G06F 1/1616 345/1.1 |
| 9,317,072 | B2* | 4/2016 | Park | G06F 1/1681 |
| 9,353,560 | B2* | 5/2016 | Sprenger | E05D 11/082 |
| 9,483,126 | B2* | 11/2016 | Sprenger | E05D 11/082 |
| 9,513,672 | B2* | 12/2016 | Garelli | G06F 1/203 |
| 2009/0144934 | A1 | 6/2009 | Kitagawa et al. | |
| 2010/0071157 | A1 | 3/2010 | Wang | |
| 2014/0292646 | A1* | 10/2014 | Kawamoto | G06F 3/01 345/156 |
| 2015/0277497 | A1* | 10/2015 | Gwin | G06F 1/1652 361/679.27 |

OTHER PUBLICATIONS

International Preliminary Report on Patentability received for PCT Patent Application No. PCT/CN2014/074178, dated Oct. 6, 2016, 10 pages.

* cited by examiner

```
┌─────────────────────────────────────────────┐
│ A Control Method For a Hybrid Hinge for Portable Devices │
│              Processing Logic                │
│                  -1100-                      │
└─────────────────────────────────────────────┘
                     ▼
┌─────────────────────────────────────────────┐
│ Provide a hybrid hinge coupling a lid of a portable device with a base of the │
│ portable device, the hybrid hinge including a mechanical component including a │
│ pivot, a lid fixture, and a base fixture, the pivot being coupled to or captured │
│ within the lid fixture and the base fixture; and an auxiliary component including │
│ one or more electro-magnetic or electro-mechanical devices and a variable │
│ electrical power source, the one or more electro-magnetic or electro-mechanical │
│ devices being configured to apply a variable degree of torque force to the pivot │
│ based on a degree of electrical power supplied by the electrical power source as │
│ programmed by a processing system of the portable device │
│                  -1110-                      │
└─────────────────────────────────────────────┘
                     ▼
┌─────────────────────────────────────────────┐
│ Detect a user or system action related to the portable device. │
│                  -1120-                      │
└─────────────────────────────────────────────┘
                     ▼
┌─────────────────────────────────────────────┐
│ Determine a current system operating mode of the portable device associated │
│ with the detected user or system action.    │
│                  -1130-                      │
└─────────────────────────────────────────────┘
                     ▼
┌─────────────────────────────────────────────┐
│ Dynamically adjust a torque force applied to the pivot of the hybrid hinge to │
│ conform with the torque force requirements for the current system operating │
│                  mode.                       │
│                  -1140-                      │
└─────────────────────────────────────────────┘
                     ▼
                  ( End )
```

Figure 9

CONTROL MECHANISM AND METHOD FOR A HYBRID HINGE FOR ELECTRONIC DEVICES

TECHNICAL FIELD

This patent application relates to electronic systems, mobile devices, and computer-implemented software, according to various example embodiments, and more specifically to a control mechanism and method for a hybrid hinge for electronic devices.

BACKGROUND

Electronic devices, such as portable devices, all-in-one desktop devices, laptop computers, handheld computers, touch screen systems, and other electronic devices typically include a base with keys and a cover or lid rotationally coupled to the base. These devices are designed for portability and convenience wherein the lid serves both as protection and as a functional portion of the device. The lid often includes a liquid crystal display (LCD) or plasma display which is functionally connected to the electronic device's data processor and memory to display information. The lid may be pivoted from a closed position in which it is folded against the base for storage or transport and to an open position for operation. In the open position, the lid is pivoted to a position so that the user can effectively see and use the screen. In some cases, using the screen can include enabling the user to effect user input by touching the screen or touchscreen on the lid. The position of the screen will depend on factors such as, the height of the user, position of the user in relation to the device, lighting conditions, and the like. These factors in conjunction with the portable nature of the device result in repetitive movement of the lid in relation to the base. This repetitive movement of the lid can result in wear of the device's connecting mechanisms, such as compressed friction washers or tensioners, and failure of the mechanism to maintain the lid in a set position. This failure of stability of placement of the lid is pronounced when the lid includes a touch screen wherein force is applied by the user against the screen and lid when in use. Traditional friction-only hinge design also drives the size and form factor of the hinge that leads to an overall increase in system thickness, which is undesirable in ultra-mobility devices. Additionally, the lid in many standard electronic devices can be pivoted to a variety of positions in a variety of operational modes. The torque control needed in these various cover positions and operational modes may be significantly varied. Standard hinge mechanisms on conventional electronic devices can support very limited variable and configurable levels of hinge torque control.

BRIEF DESCRIPTION OF THE DRAWINGS

The various embodiments are illustrated by way of example, and not by way of limitation, in the figures of the accompanying drawings in which:

FIG. 9 is a processing flow chart illustrating an example embodiment of a method as described herein.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

In the various embodiments described herein, a control mechanism and method for a hybrid hinge for electronic devices are disclosed. The example embodiment is denoted a hybrid hinge because the example embodiment includes both a mechanical component and an auxiliary component (e.g., an electrical, electro-magnetic, and/or electro-mechanical component) integrated into or augmented with a single hinge. The mechanical component can be employed alone in a default mode or the operation of the mechanical component can be configurable and modified by the auxiliary component as described in more detail below. The auxiliary component can be programmed to modify the hinge torque and thereby modify the operation of the mechanical component. By adjusting the electric power supplied to an electro-magnetic part of the auxiliary component, an electro-magnetic or electro-mechanical force is added onto a pivot of the hybrid hinge thereby modifying the torque on the pivot. A pivot is a pin, point, or shaft about which another component turns, rotates, or oscillates. This force applied to the pivot can be readily configurable and programmable. As a result, the hinge torque can be dynamically configured and controlled by the system, such as for varied user experience modes, which require different levels of hinge torque under different usage modes.

Figure 1:
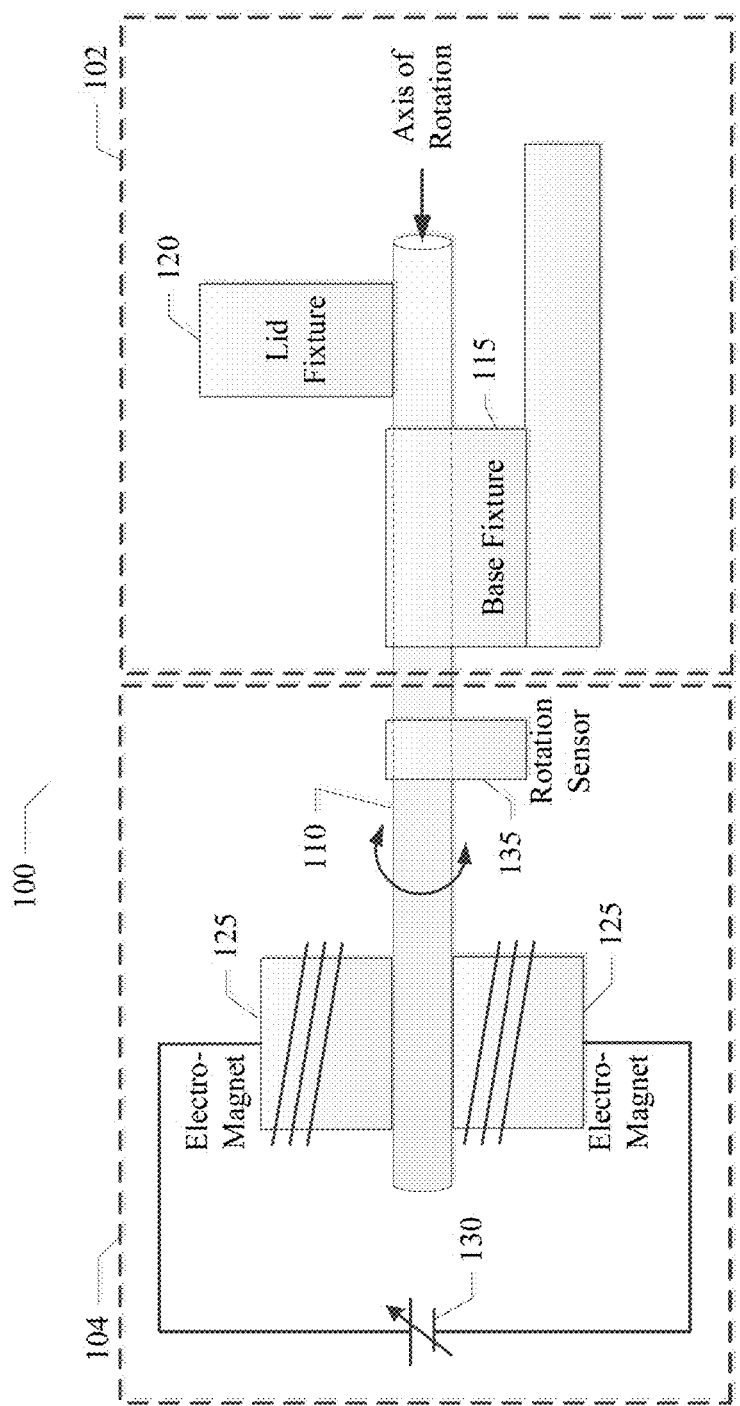
FIGS. 1 and 2 illustrate example embodiments of the hybrid hinge for enabling configurable hinge torque control in electronic devices.
Figure 2:
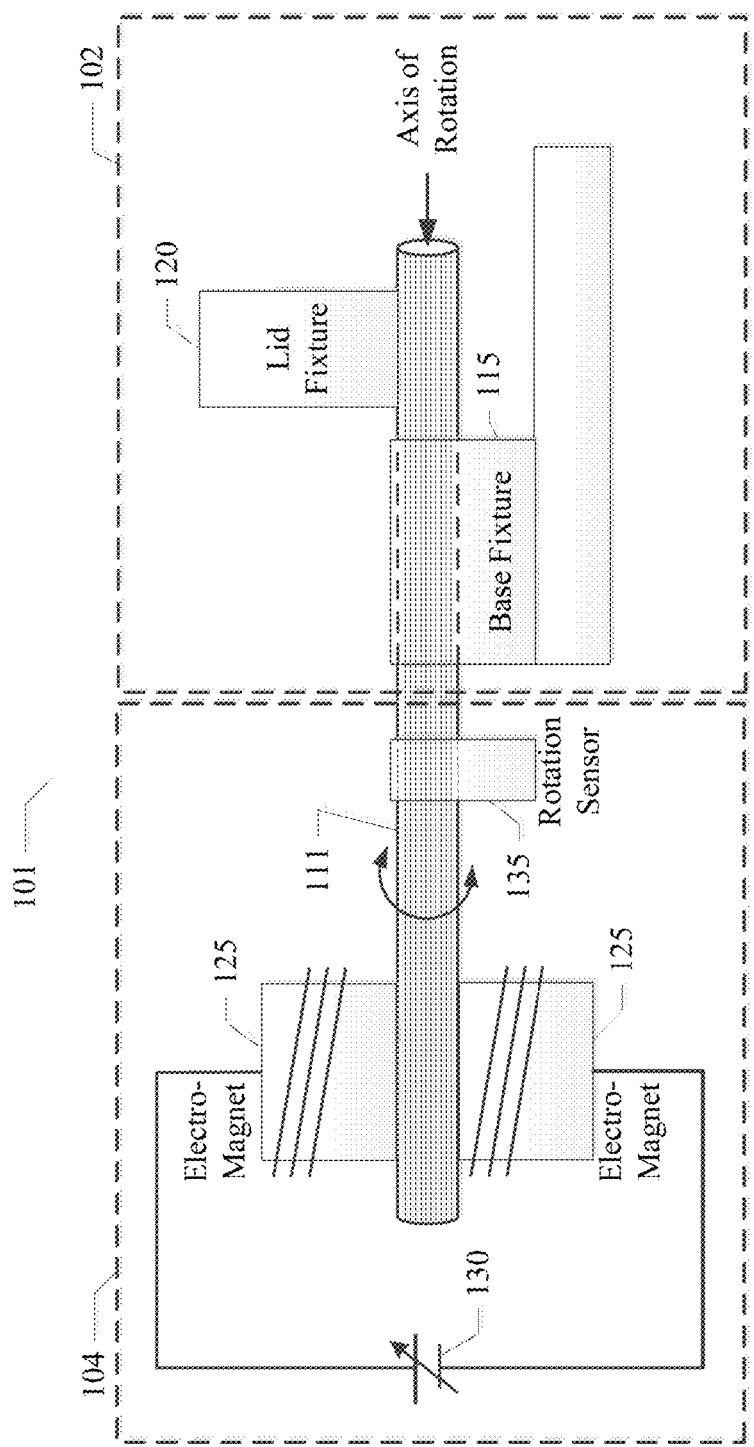
Figure 4:
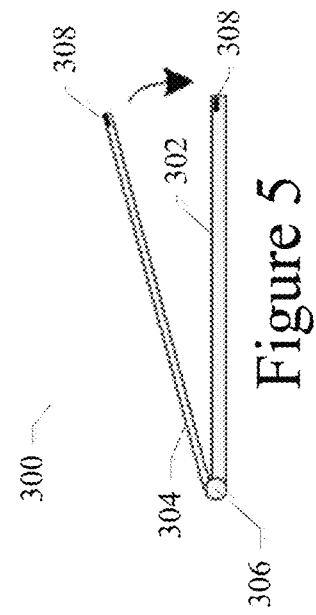
FIGS. 4 through 7 illustrate examples of a variety of form factors (e.g., convertible, detachable, etc.) and different usage models, such as touch usage deployment, for electronic devices in which a hybrid hinge can be used.

FIGS. 1 and 2 illustrate example embodiments of the hybrid hinge for enabling configurable hinge torque control in electronic devices. Referring now to FIG. 1, an example embodiment 100 described herein is configured to provide dynamic control of an auxiliary component 104 of a hybrid hinge 100 to adjust hinge torque in combination with a mechanical component 102 of the hybrid hinge 100 to realize configurable usage experience modes in various electronic devices. As shown in FIG. 1, the example embodiment 100 includes a hinge pivot 110, which can be rotated in either direction around an axis of rotation as shown in FIGS. 1 and 2. Referring briefly to FIG. 4, the pivot 110 can be installed in an electronic device 300 as pivot 306 to couple a lid 304 to a base 302 of the electronic device 300 in a rotatable coupling. Referring again to FIG. 1, the pivot 110 can be coupled to or captured within a lid fixture 120. The lid fixture 120 is a component configured for attachment to the lid 304 and thereby coupling the hybrid hinge 100 and the pivot 110 therein to the lid 304. In various embodiments, the lid fixture 120 can be or include a flat tab element, a round or circular element, a rectangular element, or a combination thereof. The lid fixture 120 can be attached to the lid 304 or a support member thereof using conventional attaching techniques. The pivot 110 can also be coupled to or captured within a base fixture 115. The base fixture 115 is a component configured for attachment to the base 302 and thereby coupling the hybrid hinge 100 and the pivot 110 therein to the base 302. In various embodiments, the base fixture 115 can be or include a flat tab element, a round or circular element, a rectangular element, or a combination thereof. The base fixture 115 can be attached to the base 302 or a support member thereof using conventional attaching techniques. The lid fixture 120 and/or the base fixture 115 can include tensioners, such as springs, friction elements, or flanges, in contact with the pivot 110 to apply a fixed level of torque force or drag to the pivot 110 when the pivot 110 is rotated. In the example embodiment, the combination of the pivot 110, the lid fixture 120, the base fixture 115, and any installed tensioners can represent the mechanical component 102 of the various embodiments described herein.

Referring still to FIGS. 1 and 2, the example embodiment includes one or more electro-magnetic and/or electro-mechanical devices 125 and a variable resistance electrical power source 130. In an example embodiment, the one or more electro-magnets 125 can be configured to apply a magnetic force to a portion of the pivot 110 and thereby impose a torque force or drag on the pivot 110. As more electrical power is applied to the one or more electro-magnets 125 via the power source 130, a greater level of torque force is applied to the pivot 110. In this manner, a variable level of torque force can be applied to the pivot 110 by varying the electrical power supplied by the electrical power source 130. In an example embodiment, the electrical power source 130 can be implemented as a conventional electrical power source combined with a variable resistance device, such as a conventional potentiometer, rheostat, or other similar variable resistance device. Such standard devices can be programmable to produce a variable level of electrical power output based on a data input received from a data processor.

In an alternative embodiment, the electro-mechanical device 125 can be configured to apply a variable mechanical force to the portion of the pivot 110 and thereby impose the torque force or drag on the pivot 110. In this embodiment, the electro-mechanical device 125 can be configured to press a mechanical element against the pivot 110 with a variable degree of force. As more electrical power is applied to the one or more electro-mechanical devices 125 via the power source 130, a greater level of torque force is applied to the pivot 110. In this manner, a variable level of torque force can be applied to the pivot 110 by varying the electrical power supplied by the electrical power source 130. In other alternative embodiments, gearing mechanisms can be attached to the pivot 110 and/or the one or more electro-mechanical devices 125 to assist in applying a variable mechanical torque force to the pivot 110. In each of the described embodiments, the one or more electro-magnetic and/or electro-mechanical devices 125 and the variable resistance electrical power source 130 can be used to apply a variable level of torque force to the pivot 110 by varying the electrical power supplied by the electrical power source 130. In the example embodiment, a rotation sensor 135 can also be used to determine the degree of movement and/or speed of movement of the pivot 110 as the pivot 110 is rotated about its axis of rotation. Such rotation sensors 135 are well-known to those of ordinary skill in the art. In the example embodiment, the combination of the pivot 110, the one or more electro-magnetic and/or electro-mechanical devices 125, the variable resistance electrical power source 130, and any installed rotation sensors 135 can represent the auxiliary component 104 of the various embodiments described herein for dynamically and variably adjusting hinge torque.

Referring now to FIG. 2, an alternative embodiment of the hybrid hinge 101 for enabling configurable hinge torque control in electronic devices is illustrated. In the example embodiment of FIG. 2, the pivot 111 can be machined to include a plurality of lateral ruts, grooves, or ridges running parallel to the axis of rotation, which generally apply an uneven but uniform surface to the pivot 111. This uneven surface of the pivot 111 can be used to change the level of torque force needed to cause the hybrid hinge 101 to operate as desired. For example, the uneven surface of the pivot 111 can cause the need for less torque force applied to the pivot 111 as produced by the mechanical and/or auxiliary components of the hybrid hinge 101. This is because the uneven surface of the pivot 111 can cause more friction between the surface of the pivot 111 and the tensioners of the mechanical component and/or the one or more electro-magnetic and/or electro-mechanical devices 125 of the auxiliary component of the hybrid hinge 101. It will be apparent to those of ordinary skill in the art in view of the disclosure herein that other modifications can be made to the pivot 110 to achieve a desired level of torque force and related movement of the pivot 110 within the hybrid hinge 100/101.

Figure 3:
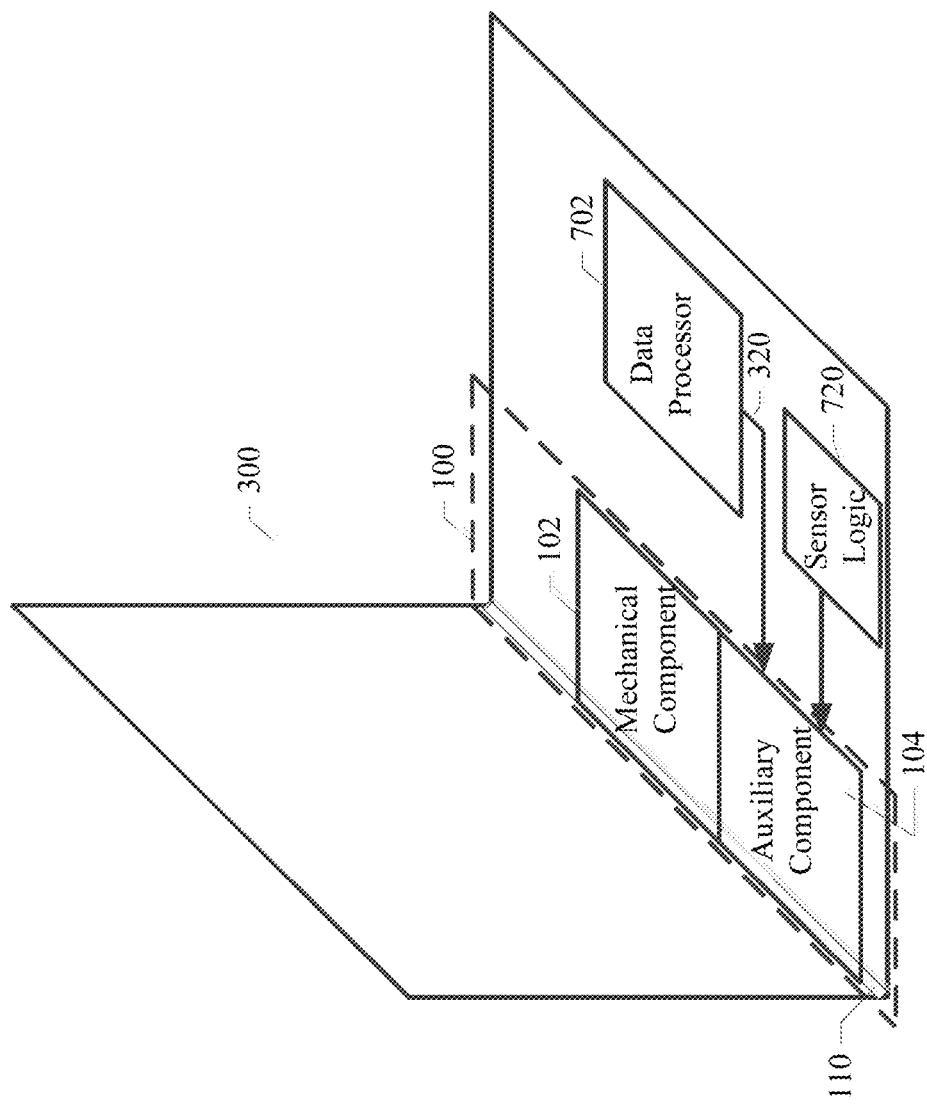
FIG. 3 illustrates a sample electronic device in which an example embodiment of the hybrid hinge can be used.

FIG. 3 illustrates a sample electronic device 300 in which an example embodiment of the hybrid hinge 100 can be used. As described above, the auxiliary component 104 of the hybrid hinge 100 can apply a variable level of torque force to the pivot 110 by programmatically varying the electrical power supplied by the electrical power source 130. The degree of electrical power supplied by the electrical power source 130 can be programmed via an input 320 provided by a data processor 702 of electronic device 300. As well-known to those of ordinary skill in the art, a standard electronic device 300 can include a data processor 702. The data processor 702 in combination with a standard operating system and/or system firmware can be used to implement a computing platform for the system and a user of the system. The computing platform can include a variety of user experience modes, such as a start-up mode, a configuration mode, a touchscreen mode, a shutdown mode, and a variety of other user experience modes. In each of these user modes or other computing platform operational modes, the torque required on the pivot 110 can vary significantly. For example, when a user first opens a lid of an electronic device, there should be a low level of torque force on the pivot 110 so the user can easily open the lid. In contrast, when a user is trying to use a touchscreen on the lid, there should be a higher level of torque force on the pivot 110 so the lid does not move when the user touches the touchscreen. These are just two examples of circumstances when the torque required on the pivot 110 needs to be modified in an electronic device based on a current user mode or operational mode. Many other circumstances can arise, especially given the variety of standard electronic devices available today and the variety of configurations and operational modes in which the standard electronic devices can be used. As also shown in FIG. 3, sensor logic 720 provides the sensor hardware and/or software to capture sensor input from a user action or system event that is used to assist in the configuration of the auxiliary component 104 of the hybrid hinge 100. The sensor logic 720 can receive sensor inputs from the rotation sensor 135 and/or the sensors 308, described below in connection with FIGS. 4 through 7. These sensors and sensor logic 720 can be used to detect motion and speed of movement of the lid of electronic device 300 and thus to infer the intent of the user when the user performs an action in a particular operational mode.

Referring now to FIGS. 4 through 7, examples of a variety of form factors (e.g., convertible, detachable, etc.) and touch usage deployments for electronic devices are illustrated. FIGS. 4 through 7 illustrate different usage models for a sample electronic device in which a hybrid hinge 100 can be used. This wide variety of form factors and usage deployments can make hinge design much more challenging. In these different electronic device usage models, the torque requirement for the hinge in various operational modes can be much different and may even conflict with each other from the standpoint of the user experience. These complex operational requirements make it difficult for a pure mechanical-based hinge design to meet these complicated user experience requirements.

Referring to FIG. 4, a sample electronic device 300 is illustrated in which a hybrid hinge 306 as described herein can be used. In the example shown in FIG. 4, a user can use just one hand to open the lid 304 of an electronic device 300 easily from a zero degree angle to an angle near or greater than 90 degrees using a constant small torque applied to the lid 304 to separate the lid 304 from the base 302. Device action sensors 308 can be installed in the lid 304 and/or base 302 to enable the data processor 702 and the operating system and/or firmware of electronic device 300 (denoted herein as the processing system of electronic device 300) to determine when and how the lid 304 is being moved. Sensors 308 can be standard motion detectors, accelerometers, proximity detectors, or other standard sensors for detecting motion and speed of movement of the lid 304. Sensors 308 can be used to detect a user's intent to adjust the lid 304 (e.g., by sensing a user's hand on the edge of the lid, or on the side of the lid 304, or on a bezel). Additionally, the rotation sensor 135 of the hybrid hinge 306 can also be used to detect movement and speed of the lid 304 by rotation of the pivot 110. As the processing system of electronic device 300 determines that the lid 304 is being moved as described above, the processing system of electronic device 300 can program the auxiliary component 104 of hybrid hinge 306 to apply a low level of torque force to the pivot 110. This low level of torque enables the user to easily open the lid 304 of the electronic device 300 without significant resistance from the hybrid hinge 306.

Figure 5:
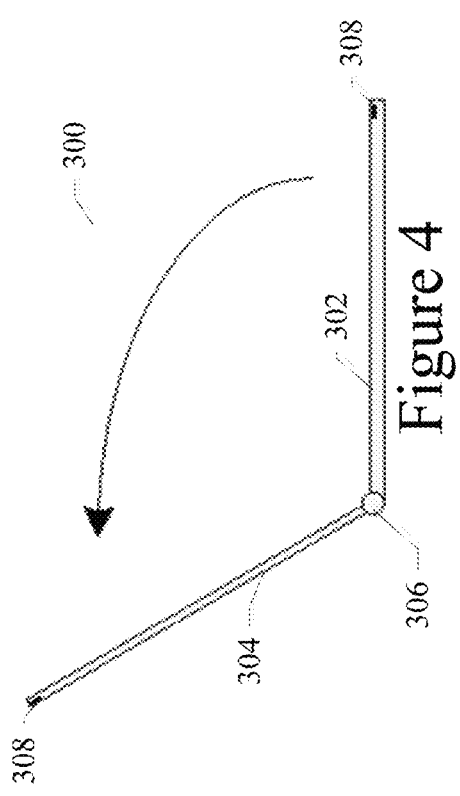

Referring now to FIG. 5, a sample electronic device 300 is illustrated in which a hybrid hinge 306 as described herein can be used. In the example shown in FIG. 5, when the user closes the lid 304 to an angle less than 30 degrees, for example, the user can remove his or her hand from the lid 304 and hybrid hinge 306 of an example embodiment can be programmed to apply a sufficient torque force to pivot 110 to softly close the lid 304 without a hard collision against the base 302. As described above, the processing system of electronic device 300 can determine that the lid 304 is being moved. In particular, the processing system of electronic device 300 can determine that the lid 304 is being closed. When closing the lid 304, the hybrid hinge 306 of an example embodiment can be programmed to apply a variable large torque initially to the pivot 110 to initiate the lid 304 closure. However, the large initial torque can be slowly ramped down to enable the soft lid 304 closures as described above.

Figure 6:
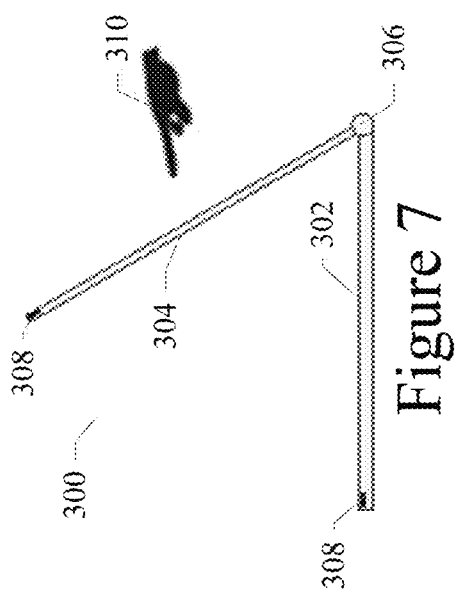

Referring now to FIG. 6, a sample electronic device 300 is illustrated in which a hybrid hinge 306 as described herein can be used. In the example shown in FIG. 6, a user can initiate a user or system mode in which a touchscreen on the lid 304 is used. For example, when the lid 304 is open to an angle greater than 90 degrees (e.g., 120 degrees) and the user starts to touch the touchscreen on the lid 304, the lid 304 needs to be firmly held in place and movement needs to be resisted using a constant large torque force applied to the pivot 110 by the hybrid hinge 306. In the example embodiments described herein, the processing system of electronic device 300 can determine that the lid 304 is being positioned for touchscreen use as described above or that the touchscreen is being used. In this case, the processing system of electronic device 300 can program the auxiliary component 104 of hybrid hinge 306 as described above to apply a high level of torque force to the pivot 110. This high level of torque enables the user to interact with the touchscreen on the lid 304 of the electronic device 300 without significant movement of the lid 304.

Figure 7:
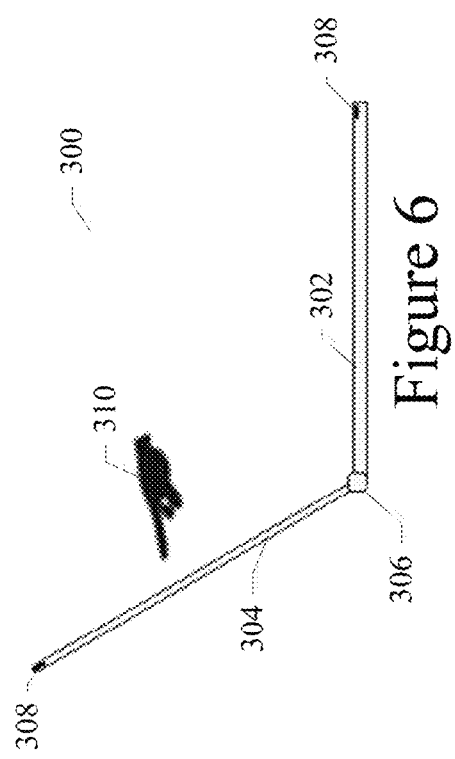

Referring now to FIG. 7, a sample electronic device 300 is illustrated in which a hybrid hinge 306 as described herein can be used. In the example shown in FIG. 7, a user can initiate a user mode in which a touchscreen on the lid 304 is used. For example, when the lid 304 is open to an angle greater than 180 degrees (e.g., 210 degrees) and the user starts to touch the touchscreen on the lid 304, the lid 304 needs to be firmly held in place and movement needs to be resisted using a constant large torque force applied to the pivot 110 by the hybrid hinge 306. In the example embodiments described herein, the processing system of electronic device 300 can determine that the lid 304 is being positioned for touchscreen use as described above or that the touchscreen is being used. In this case, the processing system of electronic device 300 can program the auxiliary component 104 of hybrid hinge 306 as described above to apply a high level of torque force to the pivot 110. This high level of torque enables the user to interact with the touchscreen on the lid 304 of the electronic device 300 without significant movement of the lid 304. In other embodiments, for example, when lid 304 is opened from 0°-360°, such as from closed (in a clam shell configuration) to a tablet, the torque force applied to the pivot 110 should be low to allow easy conversion. Using the hybrid hinge 306 and the techniques described above, a low level torque force can be dynamically applied to the pivot 110 throughout the 0°-360° rotation.

Figure 8:
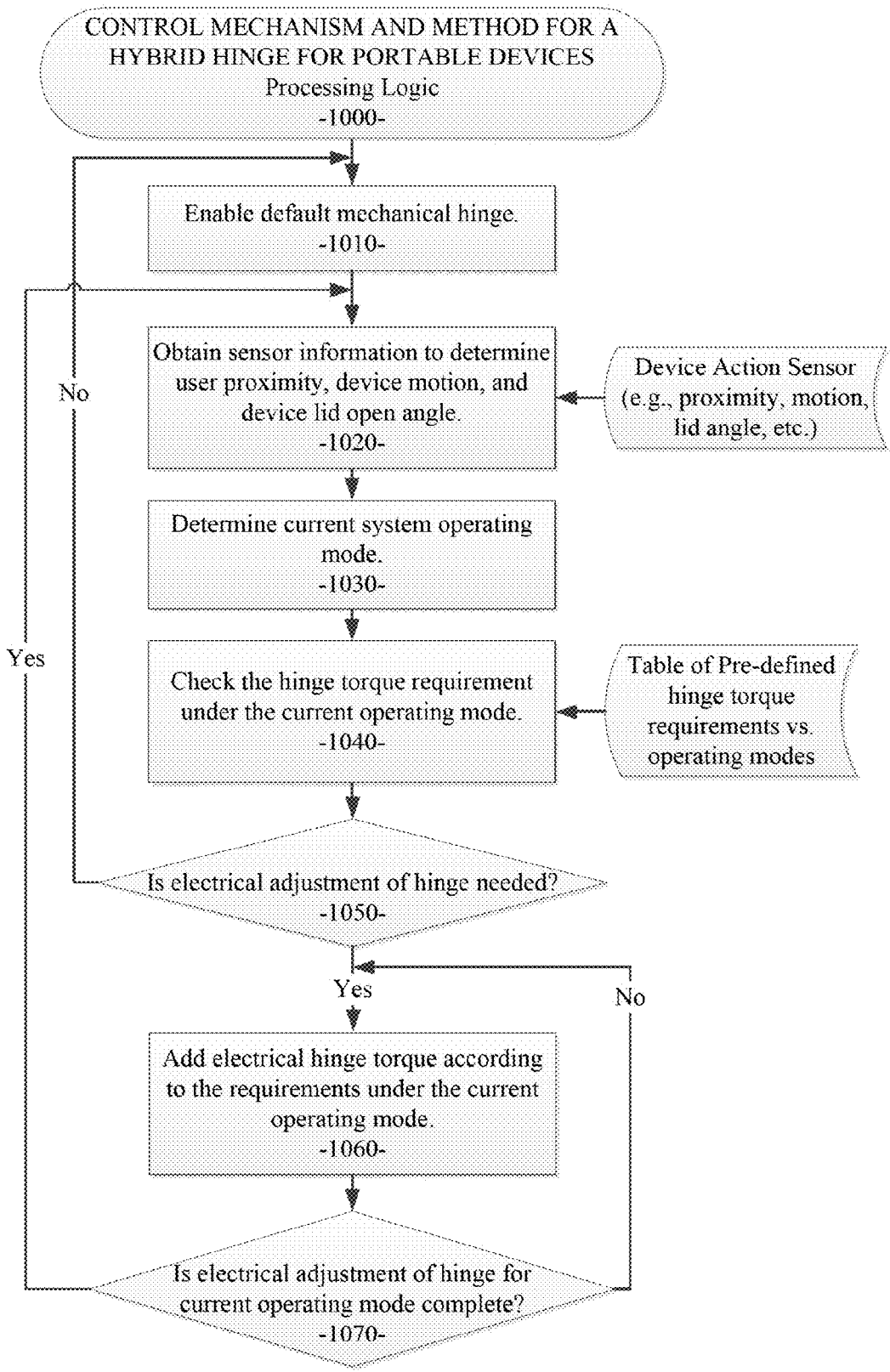
FIG. 8 is a processing flow diagram illustrating an example embodiment of a hybrid hinge control method.

Referring now to FIG. 8, a processing flow diagram illustrates an example embodiment of a hybrid hinge control method 1000 using the hybrid hinge 100 as described herein. The hybrid hinge control method 1000 of an example embodiment can be deployed in an electronic device, such as electronic device 300 described above in which a hybrid hinge 100 and a processing system are installed. The hybrid hinge control method 1000 can be used to dynamically and programmatically modify the level of torque force applied to the pivot 110 based on a user mode or operational mode of the electronic device 300. In the example embodiment shown in FIG. 8, the electronic device 300 can be configured by default to use the mechanical component 102 of the hybrid hinge 100 at processing block 1010. In processing block 1020, the processing system of electronic device 300 can detect the user's intent to adjust the lid 304 or use a touchscreen on the lid 304 as described above. Device action sensors 308 can be used to detect this user or system action. Once the processing system of electronic device 300 detects user or system action, the processing system can determine a current system operating mode or usage model of the electronic device 300 associated with the detected user or system action in processing block 1030. The processing system can perform, for example, a table look-up to determine the appropriate hinge torque requirements under the current (or new) operating mode in processing block 1040. A table of pre-defined hinge torque requirements as related to various operating modes can be created and configured at system initialization time. If the current or new operating mode has changed from a previous operating mode, it may be necessary to adjust the torque force being applied to the pivot 110 of hybrid hinge 100. This can be determined if the torque force requirements for the current or new operating mode from the table differ from the torque force configuration previously active. For example, if the electronic device 300 is currently in a clam shell mode and is being converted to a tablet mode by the user, it may be necessary to adjust the torque force being applied to the pivot 110 of hybrid hinge 100 to conform to the torque force requirements for the current or new operating mode. At decision block 1050, a test is performed to determine if adjustment of the torque force in the hybrid hinge 100 is needed. If no adjustment is needed, processing continues at the processing block 1010 as described above. If an adjustment of the hybrid hinge 100 is needed, processing continues at the processing block 1060. At processing block 1060, the torque force applied to the pivot 110 is modified to comply with the torque force requirements for the current or new operating mode based on the values obtained from the table. In this manner, the pre-defined torque force requirement values in the table enable the processing system to dynamically and programmatically modify the configuration of the hybrid hinge 100 to meet different user experience requirements. At decision block 1070, a test is performed to determine if the torque force applied to the pivot 110 has been successfully modified to comply with the torque force requirements for the current or new operating mode. If the dynamic hinge torque modification is complete, processing continues at the processing block 1020 as described above. If the dynamic hinge torque modification is not complete, processing continues at the processing block 1060 as described above. In the case where the electronic device 300 experiences a power failure or the battery drains out, the mechanical hinge component can still take charge and provide basic hinge functionality.

Referring now to FIG. 9, a processing flow diagram illustrates an example embodiment of a control method 1100 for a hybrid hinge for electronic devices as described herein. The method 1100 of an example embodiment includes: providing a hybrid hinge coupling a lid of an electronic device with a base of the electronic device, the hybrid hinge including a mechanical component including a pivot, a lid fixture, and a base fixture, the pivot being coupled to or captured within the lid fixture and the base fixture; and an auxiliary component including one or more electro-magnetic or electro-mechanical devices and a variable electrical power source, the one or more electro-magnetic or electro-mechanical devices being configured to apply a variable degree of torque force to the pivot based on a degree of electrical power supplied by the electrical power source as programmed by a processing system of the electronic device (processing block 1110); detecting a user or system action related to the electronic device (processing block 1120); determining a current system operating mode of the electronic device associated with the detected user or system action (processing block 1130); and dynamically adjusting a torque force applied to the pivot of the hybrid hinge to conform with the torque force requirements for the current system operating mode (processing block 1140).

The various embodiments as described herein can provide several advantages over conventional hinge mechanisms. Firstly, the various embodiments can meet complicated user experience requirements for hinge operation under different usage modes of an electronic device. Secondly, the various embodiments described herein can readily program hinge torque by firmware or other programmable means to easily and dynamically get the best user experience, without the need for a hinge or hardware change. This is an important advantage to reduce design cycle costs in electronic devices. Finally, the hybrid hinge as described herein can be configured to only use the auxiliary component when usage of the electronic device is going to happen (e.g., when a user approaches the electronic device when the lid is closed, or when the user touches the lid to effect the movement of the lid, or when the user opens the lid, or when the user moves a finger or pointer within a proximity zone of a touchpad on the lid, etc.). This dynamic use of the auxiliary component of the hybrid hinge saves a significant amount of power in the electronic device.

Figure 10:
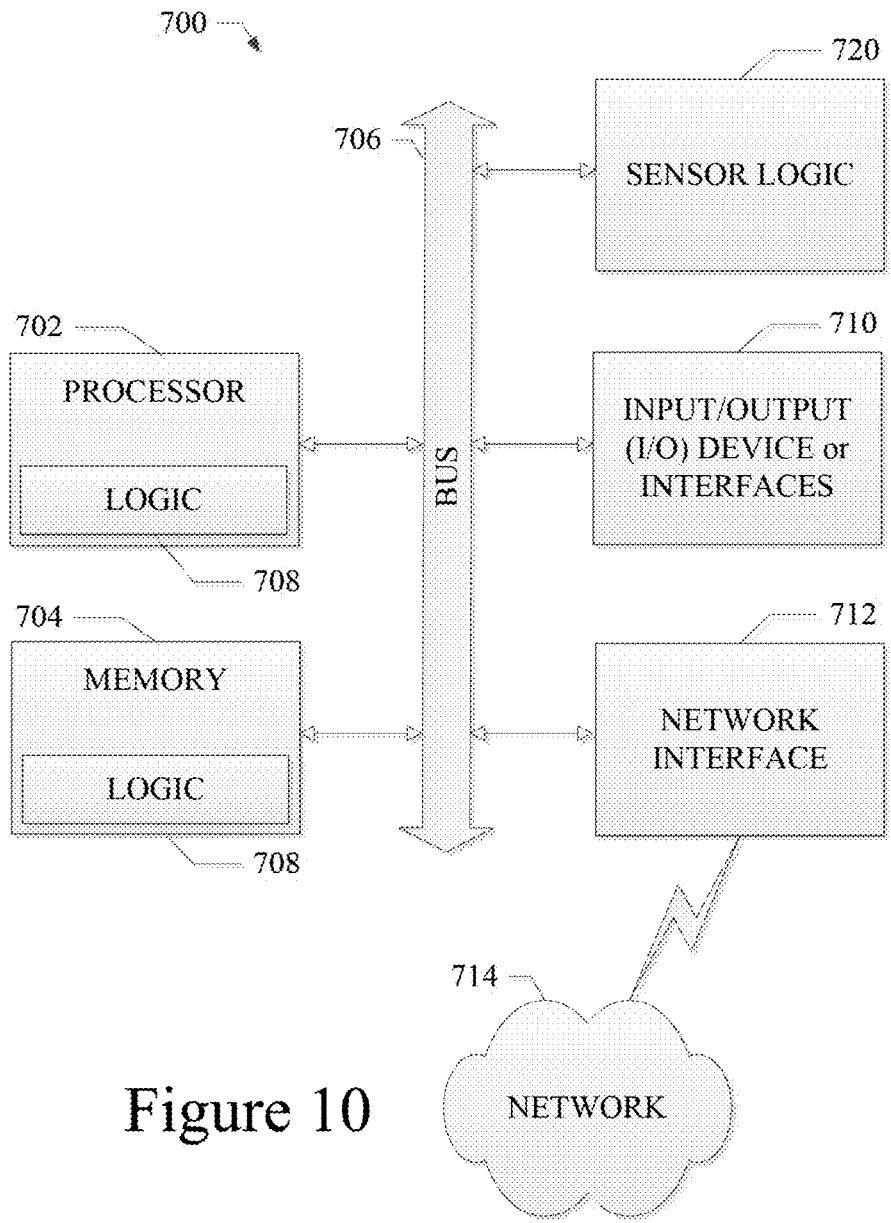
FIG. 10 shows a diagrammatic representation of a machine in the example form of a mobile computing and/or communication system within which a set of instructions when executed and/or processing logic when activated may cause the machine to perform any one or more of the methodologies described and/or claimed herein.

FIG. 10 shows a diagrammatic representation of a machine in the example form of a mobile computing and/or communication system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example mobile computing and/or communication system 700 includes a data processor 702 (e.g., a System-on-a-Chip (SoC), general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a touchscreen display, an audio jack, and optionally a network interface 712. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth, IEEE 802.11x, and the like. In essence, network interface 712 may include or support virtually any wired and/or wireless communication mechanisms by which information may travel between the mobile computing and/or communication system 700 and another computing or communication system via network 714. Sensor logic 720 provides the sensor hardware and/or software to capture sensor input from a user action or system event that is used to assist in the configuration of the auxiliary component 104 of the hybrid hinge 100 as described above.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

In various embodiments as described herein, example embodiments include at least the following examples.

A hybrid hinge for an electronic device, the hybrid hinge comprising: a pivot, a lid fixture, and a base fixture, the pivot being coupled to or captured within the lid fixture and the base fixture; and an auxiliary component including one or more electro-magnetic or electro-mechanical devices and a variable electrical power source, the one or more electro-magnetic or electro-mechanical devices being configured to apply a variable degree of torque force to the pivot based on a degree of electrical power supplied by the electrical power source.

The hybrid hinge as claimed above wherein the mechanical component further includes tensioners to apply a fixed level of torque force or drag to the pivot.

The hybrid hinge as claimed above wherein the auxiliary component further includes a rotation sensor coupled to the pivot to determine a degree of movement or speed of movement of the pivot.

The hybrid hinge as claimed above wherein the auxiliary component is configured to apply a magnetic torque force to the pivot.

The hybrid hinge as claimed above wherein the auxiliary component is configured to apply a mechanical torque force to the pivot.

The hybrid hinge as claimed above wherein the mechanical component is configured to apply a torque force to the pivot by default.

The hybrid hinge as claimed above wherein the degree of electrical power supplied by the electrical power source is programmatically controlled by a data processor in the electronic device.

The hybrid hinge as claimed above wherein the degree of electrical power supplied by the electrical power source is based on a current user or system mode.

The hybrid hinge as claimed above further including a sensor to detect an action of a user for configuring the hybrid hinge.

An electronic device system comprising: a processing system; a lid; a base; and a hybrid hinge coupling the lid with the base, the hybrid hinge including a mechanical component including a pivot, a lid fixture, and a base fixture, the pivot being coupled to or captured within the lid fixture and the base fixture; and an auxiliary component including one or more electro-magnetic or electro-mechanical devices and a variable electrical power source, the one or more electro-magnetic or electro-mechanical devices being configured to apply a variable degree of torque force to the pivot based on a degree of electrical power supplied by the electrical power source as programmed by the processing system.

The system as claimed above wherein the mechanical component further includes tensioners to apply a fixed level of torque force or drag to the pivot.

The system as claimed above wherein the auxiliary component further includes a rotation sensor coupled to the pivot to determine a degree of movement or speed of movement of the pivot.

The system as claimed above wherein the auxiliary component is configured to apply a magnetic torque force to the pivot.

The system as claimed above wherein the auxiliary component is configured to apply a mechanical torque force to the pivot.

The system as claimed above wherein the mechanical component is configured to apply a torque force to the pivot by default.

The system as claimed above wherein the degree of electrical power supplied by the electrical power source is programmatically controlled by the processing system in the electronic device.

The system as claimed above wherein the degree of electrical power supplied by the electrical power source is based on a current user or system mode.

The system as claimed above further including a sensor to detect an action of a user for configuring the hybrid hinge.

A method comprising: providing a hybrid hinge coupling a lid of an electronic device with a base of the electronic device, the hybrid hinge including a mechanical component including a pivot, a lid fixture, and a base fixture, the pivot being coupled to or captured within the lid fixture and the base fixture; and an auxiliary component including one or more electro-magnetic or electro-mechanical devices and a variable electrical power source, the one or more electro-magnetic or electro-mechanical devices being configured to apply a variable degree of torque force to the pivot based on a degree of electrical power supplied by the electrical power source as programmed by a processing system of the electronic device; detecting a user or system action related to the electronic device; determining a current system operating mode of the electronic device associated with the detected user or system action; and dynamically adjusting a torque force applied to the pivot of the hybrid hinge to conform with the torque force requirements for the current system operating mode.

The method as claimed above wherein the mechanical component further includes tensioners to apply a fixed level of torque force or drag to the pivot.

The method as claimed above wherein the auxiliary component further includes a rotation sensor coupled to the pivot to determine a degree of movement or speed of movement of the pivot.

The method as claimed above wherein the auxiliary component is configured to apply a magnetic torque force to the pivot.

The method as claimed above wherein the auxiliary component is configured to apply a mechanical torque force to the pivot.

The method as claimed above wherein the mechanical component is configured to apply a torque force to the pivot by default.

The method as claimed above wherein the degree of electrical power supplied by the electrical power source is programmatically controlled by a data processor in the electronic device.

The method as claimed above wherein the degree of electrical power supplied by the electrical power source is based on a current user or system mode.

The method as claimed above further including providing a sensor to detect an action of a user for configuring the hybrid hinge.

A hybrid hinge for an electronic device, the hybrid hinge comprising: a mechanical means including a pivot means, a lid fixture means, and a base fixture means, the pivot means being coupled to or captured within the lid fixture means and the base fixture means; and an auxiliary means including one or more electro-magnetic or electro-mechanical means and a variable electrical power source means, the one or more electro-magnetic or electro-mechanical means being configured to apply a variable degree of torque force to the pivot means based on a degree of electrical power supplied by the electrical power source means.

The hybrid hinge as claimed above wherein the mechanical means further includes tensioning means to apply a fixed level of torque force or drag to the pivot means.

The hybrid hinge as claimed above wherein the auxiliary means further includes a rotation sensing means coupled to the pivot means to determine a degree of movement or speed of movement of the pivot means.

The hybrid hinge as claimed above wherein the auxiliary means is configured to apply a magnetic torque force to the pivot means.

The hybrid hinge as claimed above wherein the auxiliary means is configured to apply a mechanical torque force to the pivot means.

The hybrid hinge as claimed above wherein the mechanical means is configured to apply a torque force to the pivot means by default.

The hybrid hinge as claimed above wherein the degree of electrical power supplied by the electrical power source means is programmatically controlled by a data processing means in the electronic device.

The hybrid hinge as claimed above wherein the degree of electrical power supplied by the electrical power source means is based on a current user or system mode.

The hybrid hinge as claimed above further including a sensing means to detect an action of a user for configuring the hybrid hinge.

An electronic device system comprising: a processing means; a lid means; a base means; and a hybrid hinge means coupling the lid means with the base means, the hybrid hinge means including a mechanical means including a pivot means, a lid fixture means, and a base fixture means, the pivot means being coupled to or captured within the lid fixture means and the base fixture means; and an auxiliary means including one or more electro-magnetic or electro-mechanical means and a variable electrical power source means, the one or more electro-magnetic or electro-mechanical means being configured to apply a variable degree of torque force to the pivot means based on a degree of electrical power supplied by the electrical power source means as programmed by the processing means.

The system as claimed above wherein the mechanical means further includes tensioning means to apply a fixed level of torque force or drag to the pivot means.

The system as claimed above wherein the auxiliary means further includes a rotation sensing means coupled to the pivot means to determine a degree of movement or speed of movement of the pivot means.

The system as claimed above wherein the auxiliary means is configured to apply a magnetic torque force to the pivot means.

The system as claimed above wherein the auxiliary means is configured to apply a mechanical torque force to the pivot means.

The system as claimed above wherein the mechanical means is configured to apply a torque force to the pivot means by default.

The system as claimed above wherein the degree of electrical power supplied by the electrical power source means is programmatically controlled by the processing means in the electronic device.

The system as claimed above wherein the degree of electrical power supplied by the electrical power source means is based on a current user or system mode.

The system as claimed above further including a sensing means to detect an action of a user for configuring the hybrid hinge.

A non-transitory machine-useable storage medium embodying instructions which, when executed by a machine, cause the machine to: detect a user or system action related to an electronic device, the electronic device having a hybrid hinge coupling a lid of the electronic device with a base of the electronic device, the hybrid hinge including a mechanical component including a pivot, a lid fixture, and a base fixture, the pivot being coupled to or captured within the lid fixture and the base fixture, the hybrid hinge including an auxiliary component including one or more electro-magnetic or electro-mechanical devices and a variable electrical power source, the one or more electro-magnetic or electro-mechanical devices being configured to apply a variable degree of torque force to the pivot based on a degree of electrical power supplied by the electrical power source as programmed by a processing system of the electronic device; determine a current system operating mode of the electronic device associated with the detected user or system action; and dynamically adjust a torque force applied to the pivot of the hybrid hinge to conform with the torque force requirements for the current system operating mode.

The machine-useable storage medium as claimed above wherein the mechanical component further includes tensioners to apply a fixed level of torque force or drag to the pivot.

The machine-useable storage medium as claimed above wherein the auxiliary component further includes a rotation sensor coupled to the pivot to determine a degree of movement or speed of movement of the pivot.

The machine-useable storage medium as claimed above wherein the auxiliary component is configured to apply a magnetic torque force to the pivot.

The machine-useable storage medium as claimed above wherein the auxiliary component is configured to apply a mechanical torque force to the pivot.

The machine-useable storage medium as claimed above wherein the mechanical component is configured to apply a torque force to the pivot by default.

The machine-useable storage medium as claimed above wherein the degree of electrical power supplied by the electrical power source is programmatically controlled by a data processor in the electronic device.

The machine-useable storage medium as claimed above wherein the degree of electrical power supplied by the electrical power source is based on a current user or system mode.

The machine-useable storage medium as claimed above further including providing a sensor to detect an action of a user for configuring the hybrid hinge.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A hybrid hinge assembly for an electronic device, the hybrid hinge assembly comprising:
   a base fixture;
   a lid fixture;
   a pivot pivotably coupling the lid fixture and the base fixture;
   one or more electro-magnetic or electro-mechanical devices to apply at least a first degree of torque force to facilitate pivoting between the lid fixture and the base fixture and to apply at least a second degree of torque force to resist pivoting between the lid fixture and the base fixture; and
   a variable electrical power source to supply first power to cause the one or more electro-magnetic or electro-mechanical devices to apply the first degree of torque force when the electronic device is operating in a first mode in which a position of the lid fixture relative to the base fixture is to be changed, the variable electrical power source to supply second power to cause the one or more electro-magnetic or electro-mechanical devices to apply the second degree of torque force when the electronic device is operating in a second mode in which the position of the lid fixture relative to the base fixture is not to be changed.

2. The hybrid hinge assembly as claimed in claim 1, wherein the pivot is coupled to or captured within the lid fixture and the base fixture.

3. The hybrid hinge assembly as claimed in claim 1, further including a rotation sensor coupled to the pivot to determine at least one of a degree of movement or speed of movement of the pivot.

4. The hybrid hinge assembly as claimed in claim 1, the one or more electro-magnetic or electro-mechanical devices is to apply a magnetic torque force to at least one of the base fixture, the lid fixture or the pivot.

5. The hybrid hinge assembly as claimed in claim 1, the one or more electro-magnetic or electro-mechanical devices is configured to apply a mechanical torque force to the pivot.

6. The hybrid hinge assembly as claimed in claim 1, further including tensioners configured to apply a torque force to the pivot by default.

7. The hybrid hinge assembly as claimed in claim 1, wherein at least one of the first power and the second power supplied by the electrical power source to the one or more electro-magnetic or electro-mechanical devices is programmatically controlled by a processor in the electronic device.

8. The hybrid hinge assembly as claimed in claim 1, further including a sensor to detect an action of a user to determine whether the electronic device is operating in the first mode or the second mode.

9. An electronic device system comprising:
   a lid;
   a base; and
   a hybrid hinge including:
      a lid fixture,
      a base fixture, and
      a pivot coupled to or captured within the lid fixture and the base fixture;
   a variable electrical power source; and
   one or more electro-magnetic or electro-mechanical devices to apply at least a first degree of torque force to the hybrid hinge to facilitate pivoting between the lid fixture and the base fixture and to apply at least a second degree of torque force to resist pivoting between the lid fixture and the base fixture based on an operating mode of the electronic device.

10. The system as claimed in claim 9, further including a processor to control the electrical power source to supply power to the at least one of the one or more electro-magnetic or electro-mechanical devices.

11. The system as claimed in claim 9, further including a rotation sensor to determine a degree of movement or speed of movement of the pivot.

12. The system as claimed in claim 9, one or more electro-magnetic or electro-mechanical devices is configured to apply a magnetic torque force to the pivot.

13. The system as claimed in claim 9, further including tensioners to apply a mechanical torque force to the pivot by default.

14. A method to operate an electronic device including a base, a lid, a hinge pivotably coupling the base and the lid, and one or more electro-magnetic or electro-mechanical devices to apply torque to at least one of the base, the lid or the hinge, the method comprising:
   detecting a user or system action related to the electronic device;
   determining, based on the user or system action, whether the electronic device is operating in a first mode in which a position of the lid relative to the base is to be changed or is operating in a second mode in which the position of the lid relative to the base is not to be changed;

applying one or more of a first range of torque forces to facilitate pivoting between the lid and the base when the electronic device is operating in the first mode; and applying one or more of a second range of torque forces to resist pivoting between the lid and the base when the electronic device is operating in the second mode.

15. The method as claimed in claim 14, wherein the torque forces in the first range are magnetic.

16. The method as claimed in claim 14, wherein the torque forces in the first range are mechanical.

17. The method as claimed in claim 14, further including applying a torque force to the hinge by default.

18. The method as claimed in claim 14, wherein electrical power supplied to the at least one of the one or more electro-magnetic or electro-mechanical devices is programmatically controlled by a processor.

19. The method as claimed in claim 14, further including:
supplying a first level of power to the at least one of the one or more electro-magnetic or electro-mechanical devices when the electronic device is operating in the first mode; and
supplying a second level of power to the at least one of the one or more electro-magnetic or electro-mechanical devices when the electronic device is operating in the second mode.

20. A non-transitory machine-useable storage medium comprising instructions which, when executed by a processing system, cause the processing system to at least: detect a user or system action related to an electronic device, the electronic device having a hybrid hinge coupling a lid of the electronic device with a base of the electronic device, the hybrid hinge including a mechanical component including a pivot, a lid fixture, and a base fixture, the pivot being coupled to or captured within the lid fixture and the base fixture, the hybrid hinge including an auxiliary component including one or more electro-magnetic or electro-mechanical devices and a variable electrical power source, the one or more electro-magnetic or electro-mechanical devices being configured to apply a variable degree of torque force to the hybrid hinge based on a degree of electrical power supplied by the electrical power source as programmed by the processing system of the electronic device; determine a current system operating mode of the electronic device associated with the detected user or system action; and dynamically adjust the torque force applied to the hybrid hinge to conform with the torque force requirements for the current system operating mode.

21. The machine-useable storage medium as claimed in claim 20, further including instructions which, when executed by the processing system, cause the processing system to at least determine a degree of movement or speed of movement of the hybrid hinge via a rotation sensor.

22. The machine-useable storage medium as claimed in claim 20, further including tensioners to apply a fixed level of torque force or drag to the hybrid hinge.

23. The machine-useable storage medium as claimed in claim 20, wherein the one or more electro-magnetic or electro-mechanical devices apply a magnetic torque force to the hybrid hinge.

24. The machine-useable storage medium as claimed in claim 20, wherein the one or more electro-magnetic or electro-mechanical devices apply a mechanical torque force to the hybrid hinge.

* * * * *

UNITED STATES PATENT AND TRADEMARK OFFICE
CERTIFICATE OF CORRECTION

PATENT NO. : 9,857,848 B2
APPLICATION NO. : 15/120352
DATED : January 2, 2018
INVENTOR(S) : Liang et al.

Page 1 of 1

It is certified that error appears in the above-identified patent and that said Letters Patent is hereby corrected as shown below:

In the Claims

Column 14, Line 5 (Claim 4): Add the word "wherein" between "claim 1," and "the"

Column 14, Line 9 (Claim 5): Add the word "wherein" between "claim 1," and "the"

Column 14, Line 49 (Claim 12): Add the word "wherein" between "claim 9," and "one or more"

Signed and Sealed this
Tenth Day of July, 2018

Andrei Iancu
*Director of the United States Patent and Trademark Office*